US011161375B2

(12) United States Patent
Mori

(10) Patent No.: US 11,161,375 B2
(45) Date of Patent: Nov. 2, 2021

(54) TIRE

(71) Applicant: Sumitomo Rubber Industries, Ltd., Kobe (JP)

(72) Inventor: Kazuma Mori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 598 days.

(21) Appl. No.: 15/981,001

(22) Filed: May 16, 2018

(65) Prior Publication Data

US 2018/0345734 A1    Dec. 6, 2018

(30) Foreign Application Priority Data

Jun. 6, 2017    (JP) .............................. JP2017-111891

(51) Int. Cl.
B60C 11/11    (2006.01)
B60C 11/12    (2006.01)
(Continued)

(52) U.S. Cl.
CPC ...... B60C 11/1369 (2013.01); B60C 11/0306 (2013.01); B60C 11/11 (2013.01);
(Continued)

(58) Field of Classification Search
CPC ............. B60C 11/1236; B60C 11/1369; B60C 11/125; B60C 11/0306; B60C 11/1204;
(Continued)

(56) References Cited

U.S. PATENT DOCUMENTS

D269,336 S  *  6/1983  Yurkovich ................... D12/596
5,814,169 A  *  9/1998  Yamaguchi ............. B60C 11/11
152/209.22
(Continued)

FOREIGN PATENT DOCUMENTS

EP          882606 A2  * 12/1998
JP       08-072510 A   *  3/1996
(Continued)

OTHER PUBLICATIONS

Machine translation for Japan 2010-126046 (Year: 2020).*
Machine translation for Japan 08-072510 (Year: 2020).*
Machine translation for Japan 2001-294023 (Year: 2021).*

*Primary Examiner* — Steven D Maki
(74) *Attorney, Agent, or Firm* — Birch, Stewart, Kolasch & Birch, LLP

(57) ABSTRACT

The tire has a tread portion 2 comprising a plurality of main grooves and a first land portion 11 divided by the main grooves. The first land portion 11 comprises a plurality of first blocks 15 divided by first lateral grooves 14. The first lateral groove 14 is provided with a first tie bar 19 raising from a part of the groove bottom excluding its end portions in the tire axial direction. The first block 15 is provided with a first sipe 20 inclined with respect to the tire axial direction to the same orientation over its entire length from a first longitudinal edge 26 to a second longitudinal edges 27 of the block. The first sipe 20 is composed of a first portion 21 extending from the first longitudinal edge 26, a second portion 22 extending from the second longitudinal edge 27, and a third portion 23 between the first portion 21 and the second portion 22. The angle with respect to the tire axial direction of the third portion 23 is greater than the angles with respect to the tire axial direction of the first portion 21 and the second portion 22.

14 Claims, 7 Drawing Sheets

(51) Int. Cl.
*B60C 11/13* (2006.01)
*B60C 11/03* (2006.01)

(52) U.S. Cl.
CPC ........ *B60C 11/1204* (2013.01); *B60C 11/125* (2013.01); *B60C 11/1236* (2013.01); *B60C 2011/0341* (2013.01); *B60C 2011/0353* (2013.01); *B60C 2011/0355* (2013.01); *B60C 2011/0365* (2013.01); *B60C 2011/0367* (2013.01); *B60C 2011/0372* (2013.01); *B60C 2011/0388* (2013.01); *B60C 2011/0395* (2013.01); *B60C 2011/1209* (2013.01); *B60C 2011/1213* (2013.01); *B60C 2011/1227* (2013.01)

(58) Field of Classification Search
CPC ............. B60C 11/11; B60C 2011/1213; B60C 2011/1209; B60C 2011/1227
See application file for complete search history.

(56) References Cited

U.S. PATENT DOCUMENTS

| | | | | |
|---|---|---|---|---|
| D762,557 S | * | 8/2016 | Xue | D12/586 |
| D781,782 S | * | 3/2017 | Neroni | D12/596 |
| 2008/0066841 A1 | * | 3/2008 | Mathews | B60C 11/0306 152/209.22 |
| 2010/0096055 A1 | * | 4/2010 | Shibano | B60C 11/1369 152/209.25 |
| 2016/0303919 A1 | | 10/2016 | Yamaoka | |
| 2018/0290498 A1 | * | 10/2018 | Kageyama | B60C 11/1204 |

FOREIGN PATENT DOCUMENTS

| | | | |
|---|---|---|---|
| JP | 2001-294023 A | * | 10/2001 |
| JP | 2010-126046 A | * | 6/2010 |
| JP | 2016-203703 A | | 12/2016 |

* cited by examiner

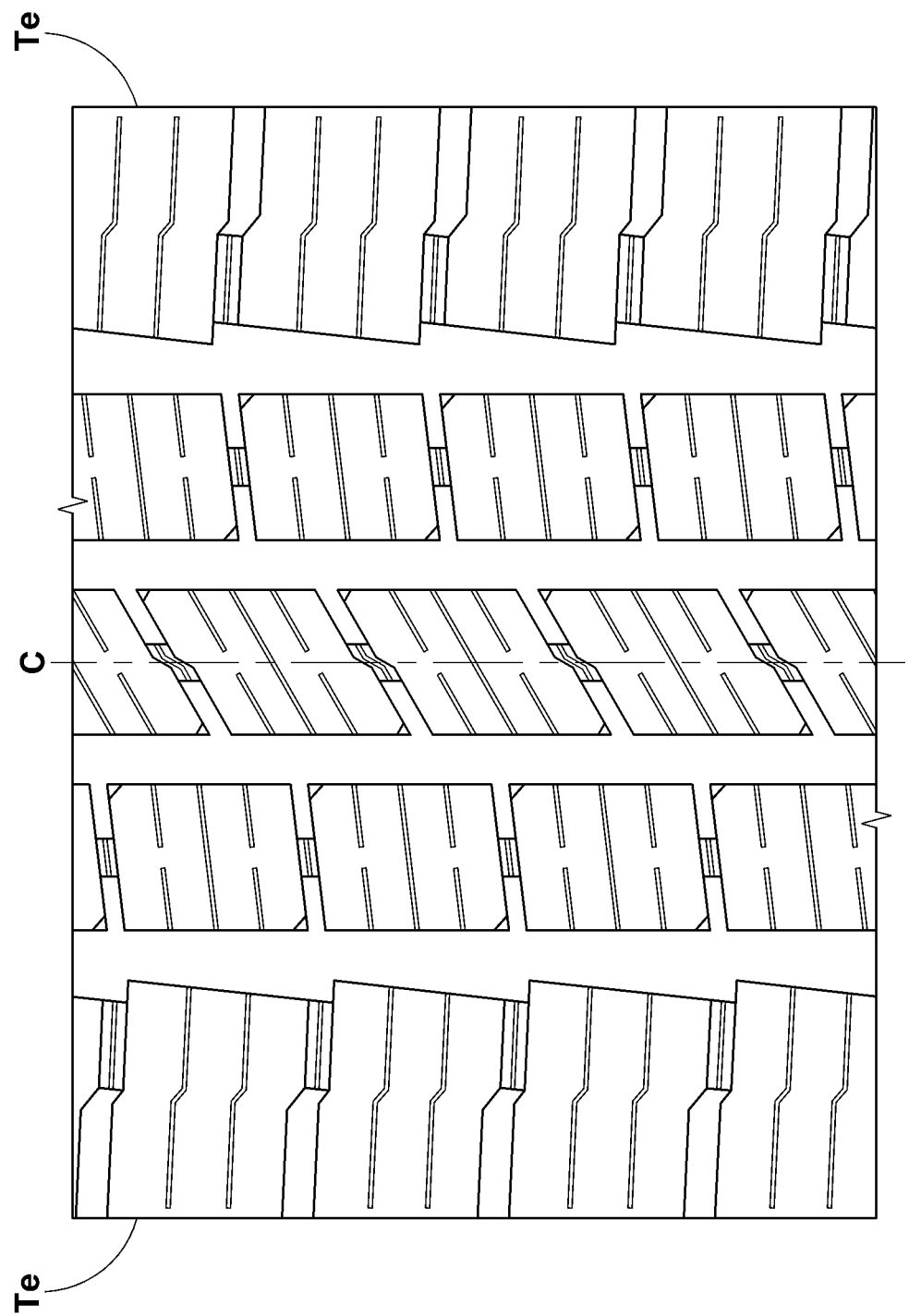

TIRE

TECHNICAL FIELD

The present invention relates to a vehicle tire, more particularly to a tread pattern capable of providing sustained excellent snow and ice performance of the tire without sacrificing steering stability on dry roads.

BACKGROUND ART

Japanese Patent Application Publication No. 2016-203703 discloses a winter tire, wherein the tread pattern is provided with main grooves extending continuously in the tire circumferential direction, lateral grooves connected with the main grooves and a number of sipes so as to be suitable for running on snowy and icy roads.

Even in such tire, if the main grooves and the lateral grooves are clogged with snow and ice during running on snowy and icy roads, it is difficult to sustain a good snow and ice performance.

SUMMARY OF THE INVENTION

In view of the problems as described above, the present invention was made, and a main object of the present invention is to provide a tire capable of sustaining excellent snow and ice performance, while maintaining the steering stability on dry roads.

According to the present invention, a tire comprises:

a tread portion provided with a plurality of main grooves extending continuously in the tire circumferential direction and a first land portion divided by the main grooves, the first land portion comprising a plurality of first blocks divided by a plurality of first lateral grooves extending across the entire width of the first land portion, each of the first lateral grooves provided with a first tie bar raising from a part of the groove bottom excluding end portions on both sides in the tire axial direction, the first blocks each having a first longitudinal edge and a second longitudinal edge which extend in the tire circumferential direction on both sides in the tire axial direction, and the first blocks each provided with a first sipe inclined with respect to the tire axial direction to one direction over its entire length from the first longitudinal edge to the second longitudinal edge, each of the first sipes comprising a first portion extending from the first longitudinal edge, a second portion extending from the second longitudinal edge, and a third portion between the first portion and the second portion, and the angle of the third portion with respect to the tire axial direction is greater than the angle of the first portion with respect to the tire axial direction and the angle of the second portion with respect to the tire axial direction.

Preferably, the first lateral groove comprises a bent portion.

Preferably, the first lateral groove comprises a pair of outside portions inclined in the same direction with respect to the tire axial direction, and a central portion disposed between the outside portions, and the central portion is inclined with respect to the tire axial direction to the same direction as the outside portions at an angle greater than those of the outside portions with respect to the tire axial direction.

Preferably, the first tie bar is arranged so as to include the central portion of the first lateral groove.

Preferably, the third portion is disposed within the axial extent of the first tie bar not to protrude therefrom.

Preferably, the first tie bar is provided with a groove-bottom sipe extending along the longitudinal direction of the first lateral groove.

Preferably, the first block is provided with at least one semi-closed sipe extending from the first or second longitudinal edge and terminated within the first block without being connected to the first sipe.

Preferably, the semi-closed sipe is inclined with respect to the tire axial direction to the same direction as the first sipe.

Preferably, the first block is divided by the first sipe into a pair of block pieces, and one of or each of the block pieces is provided with a plurality of the semi-closed sipes including a first semi-closed sipe and a second semi-closed sipe.

Preferably, the second semi-closed sipe is disposed between the first sipe and the first semi-closed sipe, and the axial length of the second semi-closed sipe is smaller than the axial length of the first semi-closed sipe.

Preferably, each of the block pieces is provided with a plurality of the semi-closed sipes which are the first semi-closed sipe and the second semi-closed sipe.

BRIEF DESCRIPTION OF THE DRAWINGS

FIG. 7 is a developed partial view of the tread portion of a Comparative Example tire.

DESCRIPTION OF THE PREFERRED EMBODIMENTS

Figure 1:
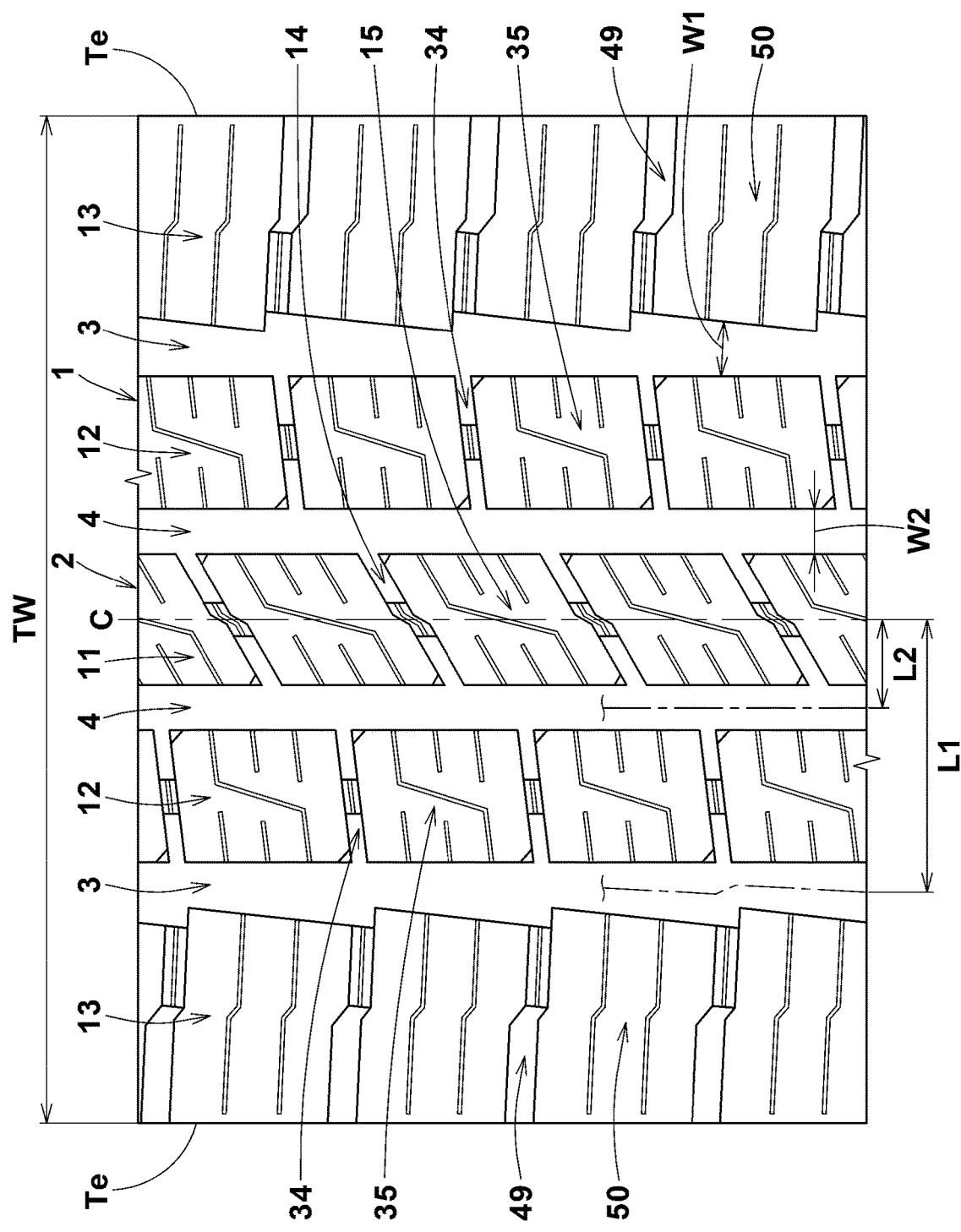
FIG. 1 is a developed partial view of the tread portion of a tire as an embodiment of the present invention.

The present invention can be applied to various tires including pneumatic tires and non-pneumatic tires called airless tires for various vehicles such as passenger cars, trucks and busses, but the present invention is suitably applied to a pneumatic tire for passenger cars.

Taking a pneumatic tire for passenger cars as example, embodiments of the present invention will now be described in detail with reference to the accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In the case of a pneumatic tire, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

The term "sipe" means a very narrow groove having a width less than 1.5 mm inclusive of a cut having no substantial width. Accordingly, the term "groove" means that having a width of 1.5 mm or more.

Going back to an embodiment of the present invention, FIG. 1 shows the tread portion 2 of the pneumatic tire 1 in the present embodiment.

The tread portion 2 is provided with a plurality of main grooves extending continuously in the tire circumferential direction.

In this embodiment, the main grooves are a pair of shoulder main grooves 3 and a crown main groove 4.

The shoulder main grooves 3 are the axially outermost main grooves disposed one on each side of the tire equator C.

The shoulder main groove 3 in this example has an axially inner edge extending along a straight line parallel with the tire circumferential direction, and an axially outer edge extending along a zigzag line.

The crown main groove 4 in this embodiment is disposed between the tire equator C and each of the shoulder main grooves 3. However, as another embodiment of the present invention, it is also possible to dispose a single crown main groove 4 on the tire equator C.

In this example, both axial edges of the crown main groove 4 are each extended along a straight line parallel with the tire circumferential direction.

The axial distance L1 from the tire equator C to the widthwise center line of each of the shoulder main grooves 3 is preferably set in a range from 0.20 to 0.30 times the tread width TW.

The axial distance L2 from the tire equator C to the widthwise center line of each of the crown main grooves 4 is preferably set in a range from 0.05 to 0.10 times the tread width TW.

The groove width W1 of the shoulder main grooves 3 and the groove width W2 of the crown main grooves 4 are preferably set in a range from 3% to 7% of the tread width TW.

In the case of a passenger car tire, the groove depth of each of the main grooves 3 and 4 is preferably set in a range of about 5 to 10 mm.

According to the present invention, however, such dimensions of the main grooves are not to be limited to the above-mentioned ranges.

In the tread portion 2, a first land portion 11 is defined by the main grooves 3, 4.

In this preferable embodiment, the first land portion 11 is formed between the crown main grooves 4 so as to positioned on the tire equator C. However, the first land portion 11 is not to be limited to such a position.

Figure 2:
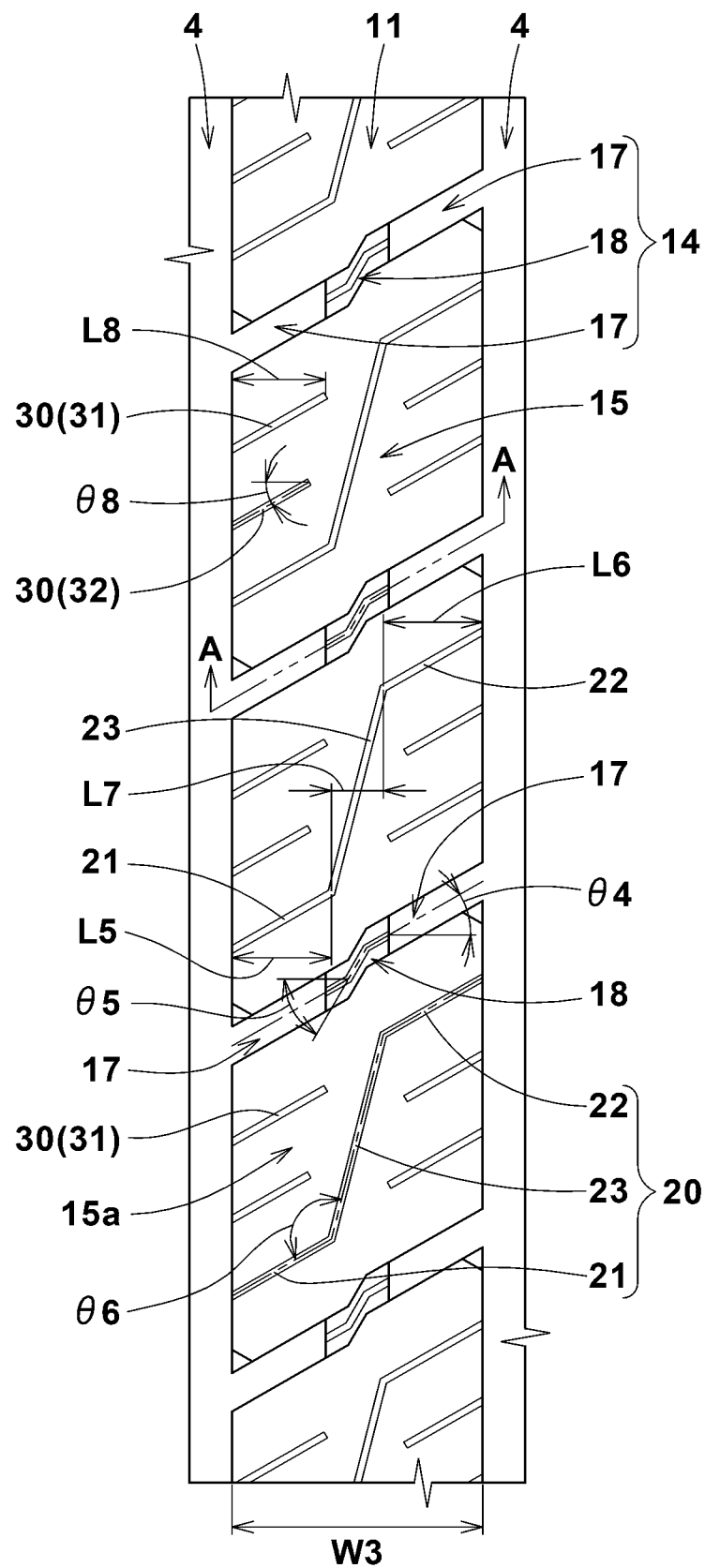
FIG. 2 is a partial top view of a first land portion of FIG. 1.

As shown in FIG. 2, the first land portion 11 is provided with a plurality of first lateral grooves 14 and thereby circumferentially divided into a plurality of first blocks 15.

The first lateral grooves 14 are inclined with respect to the tire axial direction to a first direction (in the figures, a right-side upward inclination).

The first lateral grooves 14 extend across the entire axial width of the first land portion 11.

When running on snowy and icy roads, the first lateral grooves 14 shear the snow and ice compacted into the grooves and provide high traction.

Preferably, the first lateral grooves 14 are each provided with a bent portion.

In this example, each of the first lateral groove 14 is composed of a pair of outside portions 17 and a central portion 18 therebetween.

The two outside portions 17 are inclined in the same direction with respect to the tire axial direction.

Each of the outside portions 17 is inclined at an angle $\theta 4$ of from 25 to 35 degrees with respect to the tire axial direction.

The central portion 18 is inclined with respect to the tire axial direction to the same direction as the outside portions 17. The central portion 18 is inclined at an angle $\theta 5$ greater than the angle $\theta 4$ of the outside portions 17.

Preferably, the angle $\theta 5$ is set in a range from 50 to 65 degrees.

When running on snowy and icy roads, such first lateral grooves 14 can form firmly compacted snow blocks in the grooves, therefore, it is possible to increase the shearing force of the compacted snow block.

Figure 3:
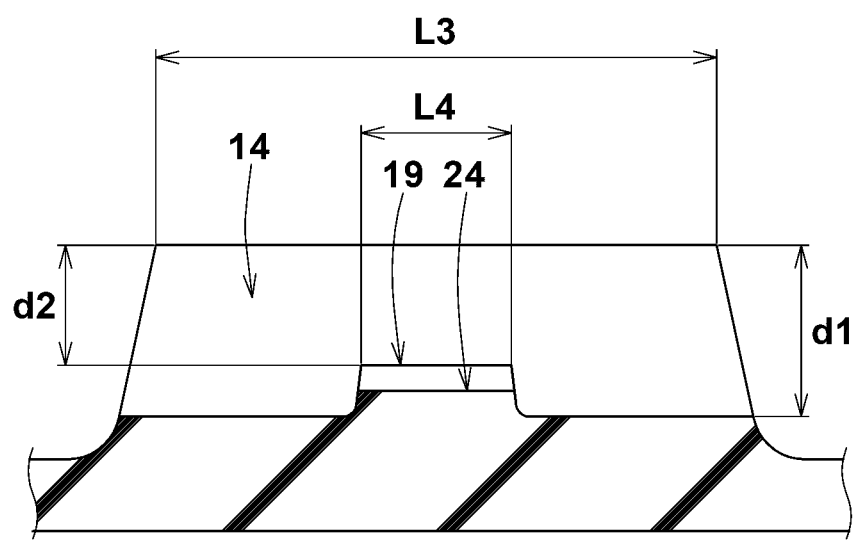
FIG. 3 is a sectional view the first land portion taken along line A-A of FIG. 2.

As shown in FIG. 3, the first lateral groove 14 is provided with a first tie bar 19 raising from a part of the groove bottom excluding its end portions on both sides in the tire axial direction.

The first tie bar 19 can moderately suppress deformation in the tire circumferential direction of each of the adjacent first blocks 15 and thus helps to maintain the steering stability on dry roads.

It is preferable that the above-mentioned central portion 18 of the first lateral groove 14 is included within the axial extent of the first tie bar 19.

Preferably, the axial extent (or axial length L4) of the first tie bar 19 is set in a range from 0.20 to 0.35 times the axial extent (or axial length L3) of the first lateral grooves 14.

As to the groove depth of the first lateral groove 14, it is preferable that the groove depth d2 at the first tie bar 19 is set in a range from 0.60 to 0.80 times the maximum groove depth d1 occurring on both sides of the first tie bar 19.

Preferably, the first tie bar 19 is provided with a groove bottom sipe 24 extending along the widthwise center line of the first lateral groove 14.

Such first tie bar 19 provided with the groove bottom sipe 24 can serve to improve the steering stability on dry roads and snow and ice performance in a good balance.

Figure 4:
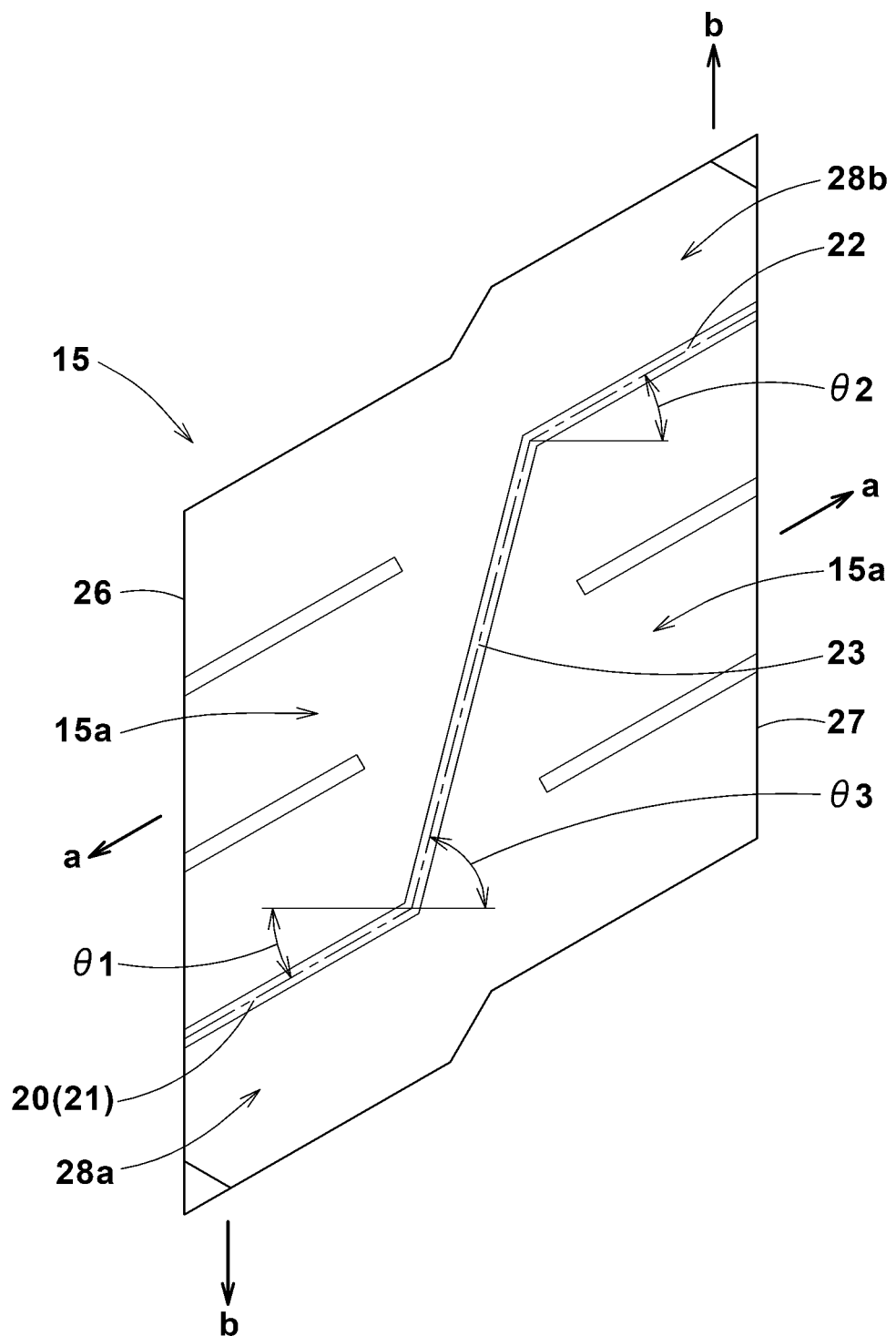
FIG. 4 is an enlarged top view of a first block of FIG. 1.

As shown in FIG. 4, the first blocks 15 are each provided with a first sipe 20 and has a first longitudinal edge 26 and a second longitudinal edge 27 which extend in the tire circumferential direction on both sides in the tire axial direction of the first block 15.

In this embodiment, each of the first and second longitudinal edge 26 and 27 extends straight in parallel with the tire circumferential direction.

The present invention is however, not limited to such embodiment. For example, the first longitudinal edge 26 and the second longitudinal edge 27 may be extended in a zigzag or wavy form.

The first sipe 20 is inclined with respect to the tire axial direction to one direction over its entire length from the first longitudinal edge 26 to the second longitudinal edge 27.

In this embodiment, with respect to the tire axial direction, the first sipes 20 are inclined to the same direction as the first lateral grooves 14.

By the first sipe 20, the first block 15 is divided into two block pieces 15a.

The first sipe 20 is composed of a first portion 21 extending from the first longitudinal edge 26, a second portion 22 extending from the second longitudinal edge 27, and a third portion 23 between the first portion 21 and second portion 22. It is preferable that each of the first, second and third portions 21, 22 and 23 extends straight.

As to the angles with respect to the tire axial direction, the angle θ3 of the third portion 23 is greater than the angle θ1 of the first portion 21 and the angle θ2 of the second portion 22.

When running on snowy and icy roads, the edges of such first sipe 20 can provide a frictional force in both the tire circumferential direction and the tire axial direction. Further, as the first sipe 20 is provided between the first portion 21 and the second portion 22 with the third portion 23 having a relatively larger angle with respect to the tire axial direction, the central portion of the first block 15 can maintain the rigidity in the tire circumferential direction, and it becomes possible to maintain high steering stability on dry roads.

Since the first sipe 20 is inclined to the same direction from the first longitudinal edge 26 to the second longitudinal edge 27, when the compressive stress in the tire circumferential direction acts on the first block 15, the block pieces 15a divided by the first sipe 20 tend to displace toward the outside of the block (to the directions of arrows (a) in FIG. 4) while making contact with each other. When running on snowy and icy roads, such behavior of the block pieces 15a helps to effectively discharge the snow from the main groove adjacent to the first land portion 11.

Further, as the first sipe 20 has the above described first portion 21, second portion 22 and third portion 23, when the block pieces are displaced toward the outside of the block, a small portion 28a between the first portion 21 and the adjacent first lateral groove 14 and a small portion 28b between the second portion 22 and the adjacent first lateral groove 14 are respectively pushed by the adjacent block pieces toward the respective adjacent first lateral grooves 14 (to directions of arrows (b) in FIG. 4) so as to reduce the groove width.

Moreover, as the first tie bar 19 is provided in a portion excluding both the end portions of the first lateral groove 14, the small portions 28a and 28b can be deformed relatively greatly without being obstructed by the first tie bar 19.

Therefore, when running on snowy and icy roads, the snow in the main grooves and the first lateral grooves 14 is more effectively discharged. Thus, the tire of the present invention can exhibit and sustain excellent snow and ice performance.

In order to further bring out the above-described effects, it is preferred that the angle θ1 of the first portion 21 and the angle θ2 of the second portion 22 are set in a range from 25 to 35 degrees. The angle θ3 of the third portion 23 is preferably set in a range from 70 to 80 degrees.

It is preferable that the angles θ1, θ2 and θ3 are set as described above so that the angle θ6 between the third portion 23 and the first portion 21/second portion 22 as shown in FIG. 2 becomes within a range from 125 to 150 degrees.

It is preferable that the axial length L5 of the first portion 21 and the axial length L6 of the second portion 22 are set in a range from 0.35 to 0.45 times the axial width W3 of the first block 15. More preferably, the axial length L5 of the first portion 21 is set to be the same as the axial length L6 of the second portion 22.

Such first sipe 20 can allow the small portions 28a and 28b to further deform largely, and can exhibit and further sustain the excellent snow and ice performance.

From similar viewpoints, it is preferred that the third portion 23 has an axial length L7 smaller than that of the first portion 21. For example, the axial length L7 is preferably set in a range from 0.15 to 0.25 times the axial width W3 of the first block 15.

As to the axial position of the third portion 23, it is preferable that the third portion 23 is disposed within the axial extent of the first tie bar 19 without protruding therefrom. Thus, it is possible to obtain the above-described effects, while maintaining the steering stability on dry roads.

Preferably, the first blocks 15 are each provided with at least one semi-closed sipe 30. The semi-closed sipe 30 extends from the first or second longitudinal edge 26, 27 and terminates within the first block 15 without being connected to the first sipe 20. In this example, the semi-closed sipe 30 is inclined with respect to the tire axial direction to the same direction as the first sipe 20. Such semi-closed sipe 30 can improve the snow and ice performance, while suppressing an excessive decrease in the rigidity of the first block 15.

In this embodiment, the above-said at least one semi-closed sipe 30 is a plurality of semi-closed sipes 30 including a first semi-closed sipe 31 and a second semi-closed sipe 32 disposed in at least one of the block pieces 15a.

In this preferable embodiment, each of the block pieces 15a is provided with the first semi-closed sipe 31 and the second semi-closed sipe 32.

In this embodiment, all the first semi-closed sipes 31 are inclined in the same direction with respect to the tire axial direction. Preferably, the first semi-closed sipe 31 extends along the adjacent first or second portion 21, 22 of the first sipe 20.

In this embodiment, the axial length of the second semi-closed sipe 32 is less than the axial length of the first semi-closed sipe 31. The second semi-closed sipe 32 is disposed between the first sipe 20 and the first semi-closed sipe 31. Thus, the rigidity of the first block 15 in a central portion in the tire circumferential direction is maintained, therefore, it is possible to effectively maintain the steering stability on dry roads.

It is preferable that the semi-closed sipes 30 are each inclined at an angle θ8 of from 25 to 35 degrees with respect to the tire axial direction. The axial length L8 of each semi-closed sipe 30 is preferably set in a range from 0.35 to 0.45 times the axial width W3 of the first block 15.

In the present embodiment, in addition to the first land portion 11, the tread portion 2 is further provided with a second land portion 12 between each of the shoulder main grooves 3 and the adjacent crown main groove 4, and a third land portions 13 between each of the shoulder main grooves 3 and the adjacent tread edge Te as shown in FIG. 1.

Figure 5:
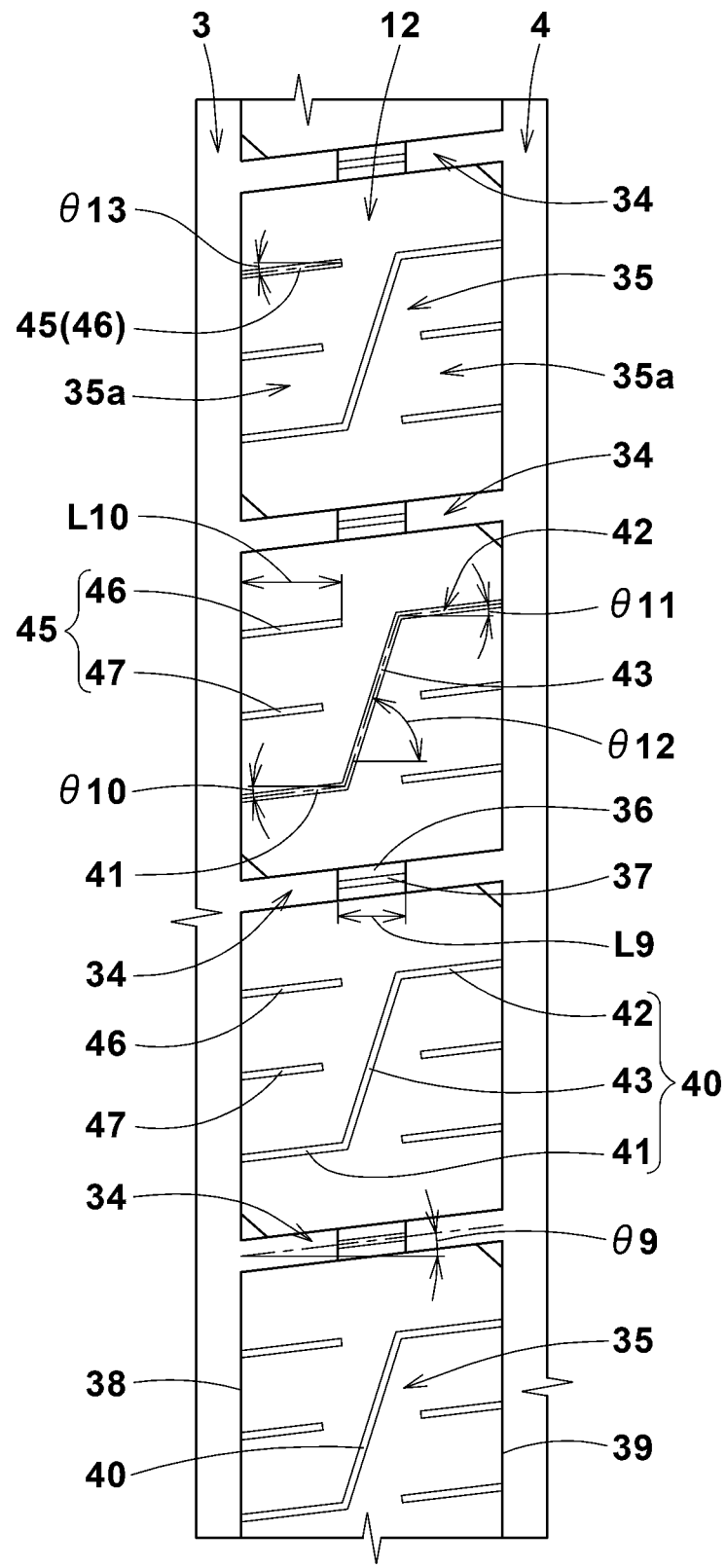
FIG. 5 is a partial top view of the second land portion of FIG. 1.

The second land portion 12 is, as shown in FIG. 5, provided with a plurality of second lateral grooves 34 extending across the entire axial with of the second land portion 12, and the second land portion 12 is circumferentially divided into a plurality of second blocks 35.

Preferably, the second lateral grooves 34 extend straight, while inclining with respect to the tire axial direction to the same direction as the first lateral grooves 14. The angle θ9 of the second lateral groove 34 with respect to the tire axial direction is preferably less than that of the first lateral grooves 14. For example, the angle θ9 is set in a range from 5 to 10 degrees.

Preferably, the second lateral grooves 34 are each provided with a second tie bar 36 raising from a part of the groove bottom excluding end portions on both sides in the tire axial direction.

It is preferable that the second tie bar 36 is disposed so as to include a central portion in the tire axial direction of the second lateral groove 34.
The axial length L9 of the second tie bar 36 is preferably set in a range from 0.20 to 0.30 times the axial width W4 of the second block 35.
Such second lateral grooves 34 moderately suppress the deformation in the tire circumferential direction of the second block 35, and help to maintain the steering stability on dry roads.

It is preferable that the second tie bar 36 is provided with a groove bottom sipe 37 extending along the widthwise center line of the second lateral groove 34.
Such groove bottom sipes 37 can enhance the steering stability on dry roads and snow and ice performance in a good balance.

In this embodiment, the second blocks 35 are each provided with a second sipe 40, and has a third longitudinal edge 38 and a fourth longitudinal edge 39 which extend in the tire circumferential direction on both sides in the tire axial direction of the second block 35.

In this example, each of the third longitudinal edge 38 and the fourth longitudinal edge 39 extends straight in parallel with the tire circumferential direction.

The second sipe 40 inclines with respect to the tire axial direction to one direction over its entire length from the third longitudinal edge 38 to the fourth longitudinal edge 39. In this example, with respect to the tire axial direction, the second sipes 40 are inclined to the same direction as the second lateral grooves 34.

By the second sipe 40, the second block 35 is divided into two block pieces 35a.

The second sipe 40 is composed of a first portion 41 extending from the third longitudinal edge 38, a second portion 42 extending from the fourth longitudinal edge 39, and a third portion 43 between the first portion 41 and second portion 42.

The above-described configurations of the first portion 21, second portion 22 and third portion 23 of the first sipe 20 may be applied to the first portion 41, second portion 42 and third portion 43, respectively.

As to the angles with respect to the tire axial direction, the angle θ12 of the third portion 43 is larger than the angle θ10 of the first portion 41 and the angle θ11 of the second portion 42. Thereby, it is possible to obtain the above-described effects.

It is preferable that the angle θ10 of the first portion 41 of the second sipe 40 and the angle θ11 of the second portion 42 of the second sipe 40 are smaller than the angle θ1 of the first portion 21 of the first sipe 20.
Specifically, the angles θ10 and θ11 are preferably set in a range from 5 to 10 degrees.
This makes it easier for the first block 15 and second block 35 to deform differently from each other when running on snowy and icy roads, thereby it becomes possible to suppress clogging of the crown main groove 4 by the snow and broken ice.

From similar viewpoint, it is preferred that the angle θ12 of the third portion 43 of the second sipes 40 is set to be smaller than the angle θ3 of the third portion 23 of the first sipe 20. Specifically, the angle θ12 is preferably set in a range from 65 to 80 degrees.

It is preferable that the third portion 43 is disposed within the axial extent of the second tie bar 36 without protruding therefrom. Thereby, it is possible to obtain the above described effects, while maintaining the steering stability on dry roads.

It is preferable that the second block 35 is provided with at least one semi-closed sipe 45.
The semi-closed sipe 45 extends from the third or fourth longitudinal edge 38, 39 and terminates within the second block 35 without being connected to the second sipes 40.
The semi-closed sipe 45 is inclined with respect to the tire axial direction to the same direction as the second sipe 40. Such semi-closed sipe 45 can improve the snow and ice performance, while maintaining the rigidity of the second block 35.

Preferably, the above-said at least one semi-closed sipe 45 is a plurality of semi-closed sipes 45 including a third semi-closed sipe 46 and a fourth semi-closed sipe 47 which are disposed in one of or each of the block pieces 35a.
In this preferable embodiment, each of the block pieces 35a is provided with the third semi-closed sipe 46 and the fourth semi-closed sipe 47.

The above-described configurations of the first semi-closed sipe 31 and second semi-closed sipe 32 disposed in the first block 15 may be applied to the third semi-closed sipe 46 and fourth semi-closed sipe 47, respectively, In this embodiment, the axial length of the fourth semi-closed sipe 47 is less than the axial length of the third semi-closed sipe 46. The fourth semi-closed sipe 47 is disposed between the third semi-closed sipe 46 and the second sipe 40. The fourth semi-closed sipe 47 can maintain the rigidity of a central portion in the tire circumferential direction of the second block 35.

It is preferable that each of the semi-closed sipes 45 is inclined at an angle θ13 of from 5 to 10 degrees with respect to the tire axial direction.
Preferably, the axial length L10 of each semi-closed sipe 45 is set in a range from 0.35 to 0.45 times the axial width W4 of the second block 35.

Figure 6:
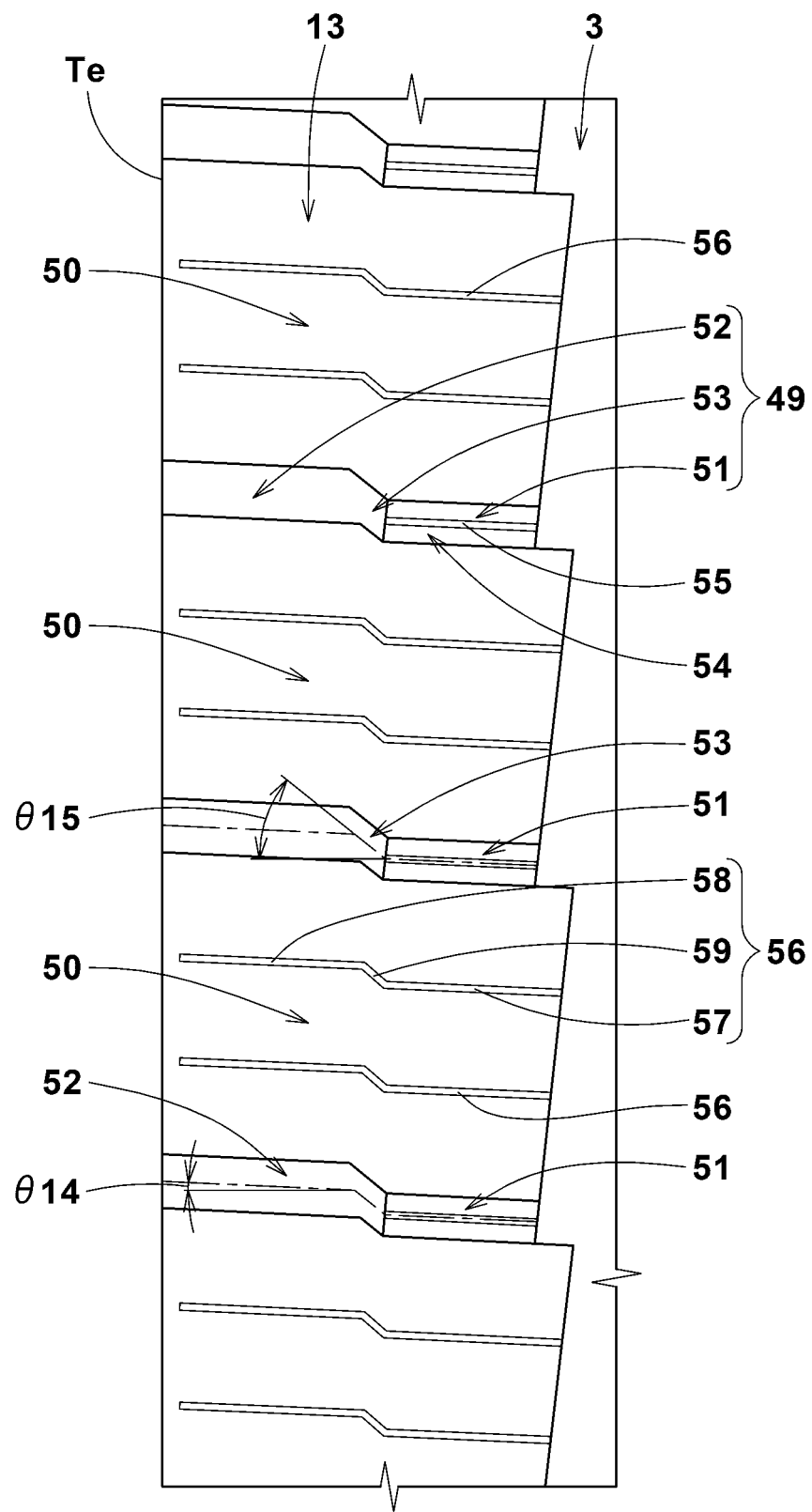
FIG. 6 is a partial top view of a third land portion of FIG. 1.

In this embodiment, each of the third land portions 13 is provided with a plurality of third lateral groove 49, and thereby circumferentially divided into a plurality of third blocks 50 as shown in FIG. 6.

Preferably, the third lateral grooves 49 are inclined with respect to the tire axial direction to the opposite direction to the first lateral grooves 14.

It is preferable that each of the third lateral grooves 49 is composed of an inner groove portion 51 extending axially outwardly from the shoulder main groove 3, an outer groove portion 52 shifted in the tire circumferential direction from the inner groove portion 51 and extending axially outwardly to the tread edge Te, and a connecting groove portion 53 connecting between the inner groove portion 51 and the outer groove portion 52. Such third lateral groove 49 can form firmly compacted snow block in the groove when running on snowy and icy roads.

Preferably, the angles θ14 with respect to the tire axial direction of the inner groove portion 51 and outer groove portion 52 are set in a range of not more than 5 degrees. Preferably, the angle θ15 with respect to the tire axial direction of the connecting groove portion 53 is set in a range from 30 to 45 degrees.

It is preferable that the third lateral grooves 49 are each provided in the inner groove portion 51 with a third tie bar 54 raising from the groove bottom.

The third tie bar 54 is preferably provided with a groove bottom sipe 55 extending along the widthwise center line of the third lateral groove 49.

The third tie bars 54 can be improved the steering stability on dry roads and snow and ice performance in a good balance.

It is preferable that each of the third block 50 is provided with at least one third sipe 56. In this example, two third sipes 56 are provided.

The third sipes 56 in this example extend axially outwardly from the shoulder main groove 3, and terminate before reaching the tread edge Te.

Such third sipes 56 can improve the snow and ice performance, while maintaining the rigidity of the third block 50. Preferably, the third sipe 56 is composed of an inner sipe portion 57 extending along the inner groove portion 51 of the third lateral groove 49 from the shoulder main groove 3, an outer sipe portion 58 disposed axially outside the inner sipe portion 57 and extending along the outer groove portion 52 of the third lateral grooves 49, and a connecting sipe portion 59 disposed between the inner sipe portion 57 and the outer sipe portion 58, and extending along the connecting groove portion 53 of the third lateral grooves 49.

The edges of such third sipes 56 can provide a frictional force in the tire axial direction when running on snowy and icy roads.

While detailed description has been made of preferable embodiments of the present invention, the present invention can be embodied in various forms without being limited to the illustrated embodiments.

Comparison Tests

Test tires of size 265/70R17 (rim size: 17×8.0 JJ) were prepared and tested for steering stability on dry roads and snow and ice performance. The test tires included working example tires (Ex1-Ex16) manufactured based on the tread pattern shown in FIG. 1, and comparative example tire (Ref) having a tread pattern shown in FIG. 7. The specifications are shown in Table 1.

<Steering Stability on Dry Roads> using a 4600 cc four-wheel drive passenger car with the test tires attached to the four wheels (tire pressure 270 kPa), a test driver evaluated the steering stability based on steering response, rigidity feeling, grip feeling and the like during running on a dry road surface.

The results are indicated in Table 1 by an index based on Ref being 100, wherein the larger the value, the better the steering stability.

<Snow and Ice Performance>

Using the above-mentioned test car, a test driver evaluated the snow and ice performance based on steering response, starting (accelerating), braking (decelerating), grip and the like when running on a snowy and icy road, and also based on lowering of these characteristics during running.

The results are indicated in Table 1 by an index based on Ref being 100, wherein the larger the value, the better the snow and ice performance.

TABLE 1

| Tire | Ref | Ex1 | Ex2 | Ex3 | Ex4 | Ex5 | Ex6 | Ex7 | Ex8 |
|---|---|---|---|---|---|---|---|---|---|
| tread pattern (FIG. No.) | 7 | 1 | 1 | 1 | 1 | 1 | 1 | 1 | 1 |
| 1st portion and 2nd portion angle θ1, θ2(deg.) | — | 30 | 20 | 25 | 35 | 40 | 30 | 30 | 30 |
| 3rd portion angle θ3(deg.) | — | 75 | 75 | 75 | 75 | 75 | 65 | 70 | 80 |
| 3rd portion length L7/1st block width W3 | — | 0.20 | 0.20 | 0.20 | 0.20 | 0.20 | 0.20 | 0.20 | 0.20 |
| 1st tie bar depth d2/1st lateral groove depth d1 | 0.70 | 0.70 | 0.70 | 0.70 | 0.70 | 0.70 | 0.70 | 0.70 | 0.70 |
| Presence or Absence of groove-bottom sipe | P | P | P | P | P | P | P | P | P |
| Steering stability | 100 | 103 | 102 | 103 | 103 | 102 | 100 | 102 | 103 |
| Snow and ice performance | 100 | 108 | 108 | 108 | 107 | 106 | 106 | 108 | 108 |

| Tire | Ex9 | Ex10 | Ex11 | Ex12 | Ex13 | Ex14 | Ex15 | Ex16 |
|---|---|---|---|---|---|---|---|---|
| tread pattern (FIG. No.) | 1 | 1 | 1 | 1 | 1 | 1 | 1 | 1 |
| 1st portion and 2nd portion angle θ1, θ2(deg.) | 30 | 30 | 30 | 30 | 30 | 30 | 30 | 30 |
| 3rd portion angle θ3(deg.) | 85 | 75 | 75 | 75 | 75 | 75 | 75 | 75 |
| 3rd portion length L7/1st block width W3 | 0.20 | 0.15 | 0.18 | 0.22 | 0.25 | 0.20 | 0.20 | 0.20 |
| 1st tie bar depth d2/1st lateral groove depth d1 | 0.70 | 0.70 | 0.70 | 0.70 | 0.70 | 0.60 | 0.80 | 0.70 |
| Presence or Absence of groove-bottom sipe | P | P | P | P | P | P | P | A |
| steering stab | 103 | 101 | 102 | 103 | 103 | 104 | 102 | 104 |
| snow and ice performance | 107 | 105 | 107 | 108 | 106 | 106 | 108 | 106 |

Through the comparison tests, it was confirmed that the tires according to the present invention exhibited excellent snow and ice performance, while maintaining the steering stability on dry roads.

DESCRIPTION OF THE REFERENCE SIGNS 2 tread portion
11 first land portion
14 first lateral groove
15 first block
19 first tie bar
20 first sipe
21 first portion
22 second portion
23 third portion
26 first longitudinal edge
27 second longitudinal edge

The invention claimed is:

1. A tire comprising:
a tread portion provided with a plurality of main grooves extending continuously in the tire circumferential direction, and a first land portion divided by the main grooves,
the first land portion comprising a plurality of first blocks divided by a plurality of first lateral grooves extending across the entire width of the first land portion,
each of the first lateral grooves comprising
a pair of outside portions inclined in a same direction with respect to the tire axial direction, and
a central portion disposed between the outside portions, and inclined with respect to the tire axial direction to the same direction as the outside portions at an angle greater than those of the outside portions with respect to the tire axial direction,
each of the first lateral grooves provided with a first tie bar raising from a part of the groove bottom excluding end portions on both sides in the tire axial direction,
the first blocks each having a first longitudinal edge and a second longitudinal edge which extend in the tire circumferential direction on both sides in the tire axial direction, and
the first blocks each provided with a first sipe inclined with respect to the tire axial direction to one direction over its entire length from the first longitudinal edge to the second longitudinal edge so that each of the first blocks is divided by the first sipe into a pair of block pieces,
each of the first sipes comprising a first portion extending from the first longitudinal edge, a second portion extending from the second longitudinal edge, and a third portion between the first portion and the second portion,
wherein the angle of the third portion with respect to the tire axial direction is greater than the angle of the first portion with respect to the tire axial direction and the angle of the second portion with respect to the tire axial direction, and
wherein
the block pieces of each of the first blocks are each provided with a first semi-closed sipe and a second semi-closed sipe which are extended from the first or second longitudinal edge and terminated within the first block without being connected to the first sipe,
wherein
said first tie bar is arranged so as to include the central portion of the first lateral groove, and
wherein
the depth $d2$ from the open top of the first lateral groove to the first tie bar is constant over the entire length $L4$ of the first tie bar along the first lateral groove, and in a range from 0.60 to 0.80 times the maximum groove depth $d1$ of the first lateral groove.

2. The tire according to claim 1, wherein
each said first lateral groove comprises a bent portion.

3. The tire according to claim 1, wherein
the third portions are disposed within the axial extent of the first tie bars.

4. The tire according to claim 1, wherein
the first semi-closed sipe and the second semi-closed sipe are inclined with respect to the tire axial direction to the same direction as the first sipe.

5. The tire according to claim 1, wherein
the second semi-closed sipe is disposed between the first sipe and the first semi-closed sipe, and
the axial length of the second semi-closed sipe is smaller than the axial length of the first semi-closed sipe.

6. A tire comprising:
a tread portion provided with a plurality of main grooves extending continuously in the tire circumferential direction, and a first land portion divided by the main grooves,
the first land portion comprising a plurality of first blocks divided by a plurality of first lateral grooves extending across the entire width of the first land portion,
each of the first lateral grooves comprising
a pair of outside portions inclined in a same direction with respect to the tire axial direction, and
a central portion disposed between the outside portions, and inclined with respect to the tire axial direction to the same direction as the outside portions at an angle greater than those of the outside portions with respect to the tire axial direction,
each of the first lateral grooves provided with a first tie bar raising from a part of the groove bottom excluding end portions on both sides in the tire axial direction,
the first blocks each having a first longitudinal edge and a second longitudinal edge which extend in the tire circumferential direction on both sides in the tire axial direction, and
the first blocks each provided with a first sipe inclined with respect to the tire axial direction to one direction over its entire length from the first longitudinal edge to the second longitudinal edge so that each of the first blocks is divided by the first sipe into a pair of block pieces,
each of the first sipes comprising a first portion extending from the first longitudinal edge, a second portion extending from the second longitudinal edge, and a third portion between the first portion and the second portion,
wherein the angle of the third portion with respect to the tire axial direction is greater than the angle of the first portion with respect to the tire axial direction and the angle of the second portion with respect to the tire axial direction, and
wherein
the block pieces of each of the first blocks are each provided with a first semi-closed sipe and a second semi-closed sipe which are extended from the first or second longitudinal edge and terminated within the first block without being connected to the first sipe, wherein
the first blocks are disposed on the tire equator,
wherein
the tread portion is provided with four main grooves extending continuously in the tire circumferential direction, which are a pair of shoulder main grooves and a pair of crown main grooves disposed therebetween,
each of the crown main grooves is a straight groove, and
each of the shoulder main grooves has an axially inner groove edge extending along a straight circumferential line, and an axially outer groove edge extending zigzag in the tire circumferential direction, and
wherein
the tread portion is provided with second lateral grooves extending axially outwardly from the crown main grooves to the shoulder main grooves and inclined with respect to the tire axial direction to the same direction as the first lateral grooves at an angle θ9 of from 5 to 10 degrees which is smaller than the first lateral grooves.

7. The tire according to claim 6, wherein
the second lateral grooves are straight grooves.

8. The tire according to claim 7, wherein
parallelogram second blocks are defined by the second lateral grooves, the crown main grooves, and the shoulder main grooves.

9. The tire according to claim 8, wherein
each of the second blocks is provided with a second sipe and divided into a pair of block pieces by the second sipe,
the second sipe (40) is composed of a first portion (41), a second portion (42), and a third portion (43) extending between the first portion (41) and the second portion (42), wherein
the angle θ10 of the first portion (41) and the angle θ11 of the second portion (42) with respect to the tire axial direction are smaller than the angle θ1 of the first portions (21) of the first sipes (20), and
the angle θ12 of the third portion (43) with respect to the tire axial direction is smaller than the angle θ3 of the third portions (23) of the first sipes (20).

10. The tire according to claim 9, wherein
the angle θ10 and the angle θ11 are in a range from 5 to 10 degrees, and
the angle θ12 is in a range from 65 to 80 degrees.

11. The tire according to claim 9, wherein
the block pieces of the second blocks are each provided with a long third semi-closed sipe (46) and a short fourth semi-closed sipe (47), and the fourth semi-closed sipe (47) is disposed between the second sipe (40) and the third semi-closed sipe (46).

12. The tire according to claim 11, wherein
the second lateral grooves (34), the first portions (41) and the second portions (42) of the second sipes (40), the third semi-closed sipes (46), and the fourth semi-closed sipes (47) are substantially parallel with each other.

13. The tire according to claim 6, wherein
the second lateral grooves (34) are each provided with a second tie bar (36).

14. A tire comprising:
a tread portion provided with a plurality of main grooves extending continuously in the tire circumferential direction, and a first land portion divided by the main grooves,
the first land portion comprising a plurality of first blocks divided by a plurality of first lateral grooves extending across the entire width of the first land portion,
each of the first lateral grooves comprising
a pair of outside portions inclined in a same direction with respect to the tire axial direction, and
a central portion disposed between the outside portions, and inclined with respect to the tire axial direction to the same direction as the outside portions at an angle greater than those of the outside portions with respect to the tire axial direction,
each of the first lateral grooves provided with a first tie bar raising from a part of the groove bottom excluding end portions on both sides in the tire axial direction,
the first blocks each having a first longitudinal edge and a second longitudinal edge which extend in the tire circumferential direction on both sides in the tire axial direction, and
the first blocks each provided with a first sipe inclined with respect to the tire axial direction to one direction over its entire length from the first longitudinal edge to the second longitudinal edge so that each of the first blocks is divided by the first sipe into a pair of block pieces,
each of the first sipes comprising a first portion extending from the first longitudinal edge, a second portion extending from the second longitudinal edge, and a third portion between the first portion and the second portion,
wherein the angle of the third portion with respect to the tire axial direction is greater than the angle of the first portion with respect to the tire axial direction and the angle of the second portion with respect to the tire axial direction,
wherein
the block pieces of each of the first blocks are each provided with a first semi-closed sipe and a second semi-closed sipe which are extended from the first or second longitudinal edge and terminated within the first block without being connected to the first sipe,
wherein
each said first tie bar is provided with a groove-bottom sipe extending along the longitudinal direction of the first lateral groove, and
wherein
the depth d2 from the open top of the first lateral groove to the first tie bar is constant over the entire length L4 of the first tie bar along the first lateral groove, and in a range from 0.60 to 0.80 times the maximum groove depth d1 of the first lateral groove.

* * * * *